United States Patent [19]

Choate et al.

[11] Patent Number: 4,972,031

[45] Date of Patent: Nov. 20, 1990

[54] PLASTIC MOULDING COMPOSITION COMPRISING AN UNCURED OR PARTLY CURED THERMOSET RESIN PRECURSOR AND A POLYARYLSULPHONE

[75] Inventors: Martin T. Choate, Winona, Minn.; Patrick T. McGrail, Saltburn, England; Mark S. Sefton, Northallerton, England; Jeffrey T. Carter, Redcar, England

[73] Assignee: Imperial Chemical Industries PLC, London, England

[21] Appl. No.: 253,595

[22] Filed: Oct. 5, 1988

[51] Int. Cl.$^5$ ............................................. C08C 75/23
[52] U.S. Cl. ..................................... 525/535; 525/150; 525/189; 525/390; 525/396; 525/505; 525/523; 525/534; 524/540; 524/456; 524/609
[58] Field of Search ............... 525/505, 523, 535, 390, 525/396

[56] References Cited

U.S. PATENT DOCUMENTS

| | | | |
|---|---|---|---|
| 3,530,087 | 9/1970 | Hayes et al. | 260/37 |
| 3,763,088 | 10/1973 | Izawa et al. | 525/396 X |
| 4,608,404 | 8/1986 | Gardner et al. | 523/400 |
| 4,656,207 | 4/1987 | Jabloner et al. | 523/400 |
| 4,656,208 | 4/1987 | Chu et al. | 523/400 |
| 4,661,559 | 4/1987 | Gardner et al. | 525/65 |
| 4,663,401 | 5/1987 | Saito et al. | 525/505 |
| 4,677,144 | 6/1987 | Yasuda et al. | 523/456 |

FOREIGN PATENT DOCUMENTS

| | | |
|---|---|---|
| 0233966 | 9/1987 | European Pat. Off. . |
| 2052225 | 5/1971 | Fed. Rep. of Germany . |
| 0011360 | 1/1984 | Japan . |

*Primary Examiner*—Melvyn I. Marquis
*Assistant Examiner*—David W. Woodward
*Attorney, Agent, or Firm*—Cushman, Darby & Cushman

[57] ABSTRACT

A moulding composition comprising an uncured or partly, cured thermoset resin precursor and, mixed intimately therewith, a polyarylsulphone containing the repeating unit $(Ph, SO_2, PH)_n$, where Ph is phenylene and n is 1 or 2, linked through ether and/or thioether.

7 Claims, No Drawings

PLASTIC MOULDING COMPOSITION COMPRISING AN UNCURED OR PARTLY CURED THERMOSET RESIN PRECURSOR AND A POLYARYLSULPHONE

This invention relates to a plastic moulding composition comprising a thermoplast component and a thermoset component, to a method of making it and to moulded articles made therefrom.

In our copending EP-A-311349 (published Apr. 12, 1990) we describe such a combination of components in broad detail and with particular reference to the production of fibre-reinforced laminates. We have now found that these components can be brought together so as to be shapeable by moulding; by "moulding" we means to include extrusion, injection-moulding and compression-moulding and transfer-moulding.

According to the invention a moulding composition comprises an uncured or partly cured thermoset resin precursor having a softening point and, mixed intimately therewith, a polyarylsulphone containing the repeating units $(PhSO_2Ph)_n$ where Ph is phenylene (especially paraphenylene) linked through ether and/or thioether, where n=1 to 2 and can be fractional. The polyarylsulphone preferably contains also units $(Ph)_a$ so linked, a is 1 to 3 and can be fractional and groups Ph are linked linearly through a single chemical bond or a divalent group other than $SO_2$ or are fused together. By "fractional" reference is made to the average value for a given polymer chain containing units having various values of n or a.

The intimacy of mixing of the precursor and the polyarysulphone is preferably at least such that the precursor plasticises the polysulphone to an extent rendering it flowable under sheaf at a temperature at least 5° C. below the curing temperature of the precursor. More preferably the polyarylsulphone is in solution in the thermoset resin precursor. Relative proportions of the said repeating units is such that on average at least two units $(PhSO_2Ph)_n$ are in immediate mutual succession in each polymer chain present and is preferably in the range 1:99 to 99:1 , especially 10:90 to 90:10, respectively. Typically the ratio is in the range 25–50 $(Ph)_a$, balance $(PhSO_2Ph)_n$. In preferred polyarylsulphones a=1 and the units are $XPhSO_2PhXPhSO_2Ph$ ("PES")     I;

and $XPh_aXPhSO_2Ph$ ("PEES")     II where X is O or S and may differ from unit to unit; the ratio of I to II (respectively) preferably between 10:90 and 80:20 especially between 10:90 and 55:45.

The preferred relative proportions of the repeating units of the polyarylsulphone may be expressed in terms of the weight percent $SO_2$ content, defined as 100 times (weight of $SO_2$)/(weight of average repeat unit). The preferred $SO_2$ content is at least 22, preferably 23 to 25%. When a=1 this corresponds to PES/PEES ratios of at least 20:80, preferably in the range 35:65 to 65:35. These proportions favourably affect the morphology the resin/polymer combination as will be described below.

The above proportions refer only to the unit mentioned. in addition to such units the polyarylsulphone may contain up to 50 especially up to 25% molar of other repeating units: the preferred $SO_2$ content ranges (if used) then apply to the whole polymer. Such units may be for example of the formula

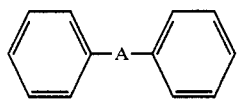

in which A is a direct link, oxygen, sulphur, —CO— or a divalent hydrocarbon radical. When the polyarylsulphone is the product of nucleophilic synthesis, its units may have been derived for example from one or more the following bisphenols and/or corresponding bis-thiols or phenol-thiols:
hydroquinone
4,4'-dihydroxybiphenyl
resorcinol
dihydroxynaphthalene (2,6 and other isomers)
4,4'-dihydroxydiphenyl ether or -thioether
4,4'-dihydroxybenzophenone
2,2'-di-(4-hydroxyphenyl)-propane or -methane.

If a bis-thiol is used, it may be formed in situ, that is, a dihalide as described for example below may be reacted with an alkali sulphide or polysulphide or thiosulphate.

Other examples of such additional units are of the formula

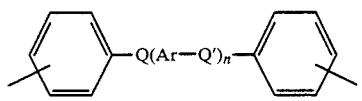

in which Q and Q', which may be the same or different, are CO or $SO_2$; Ar is a divalent aromatic radical; and n is 0, 1, 2, or 3, provided that n is not zero where Q is $SO_2$. Ar is preferably at least one divalent aromatic radical selected from phenylene, biphenylene or terphenylene. Particular units have the formula

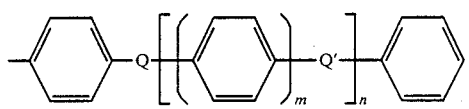

where m is 1, 2 or 3. When the polymer is the product of nucleophilic synthesis, such units may have been derived from one or more dihalides, for example:
4,4'-dihalobenzophenone
4,4'bis-(4-chlorophenylsulphonyl)biphenyl
1, 4bis-(4-halobenzoyl)benzene
4,4'-bis-(4-halobenzoyl)biphenyl They may of course have been derived partly from the corresponding bisphenols.

The polyarylsulphone may be the product of nucleophilic synthesis from halophenols and/or halothiophenols. In any nucleophilic synthesis the halogen if chlorine or bromine may be activated by the presence of a copper catalyst. Such activation is often unnecessary if the halogen is activated by an electron withdrawing group. In any event fluoride is usually more active than chloride. Any nucleophilic synthesis of the polyarylsulphone is carried out preferably in presence of one or more alkali metal carbonates in up to 10% molar excess over the stoichiometric and of an aromatic sulphone solvent, at a temperature in the range 150-350 °C.

If desired, the polyarylsulphone may be the product of electrophilic synthesis.

The number average molecular weight of the polyarylsulphone is suitably in the range 2000 to 60,000. Preferably it is over 9000 especially over 10000 for example 11,000 to 25,000 and structurally as well as by chemical interaction increases toughness by comparison with that of the thermoset resin alone by providing zones of the tough thermoplast between cross-linked thermoset zones. Another useful subrange is 3000-11,000, especially 3000-9000 in which it acts more as a chain-extender for the thermoset resin, separating and diluting local cross-link zones and thus toughening the structure. Within the above definition of the polyarylsulphone those are preferably chosen which are miscible with suitable epoxy resin precursors, have high modulus and Tg and are tough.

It is convenient to use reduced viscosity (RV), measured on a solution of 1 g of polymer in 100 ml of solution in dimethyl formamide at 25° C. as an indication of molecular weight, the correlation being as follows:

| RV | 0.15 | 0.25 | 0.45 | 0.92 |
|---|---|---|---|---|
| MW (number average) | 5000 | 13000 | 20000 | 60000 |

(Such molecular weights were in fact measured by vapour phase osmometry and are of course subject to the usual error range of about 10%).

The polyarylsulphone preferably contains end groups and/or pendant groups of formula A'—Y where A' is a divalent hydrocarbon group, preferably aromatic, and Y is a group reactive with the thermoset precursor or with a curing agent or with like groups on other polymer molecules. Examples of Y are groups providing active hydrogen especially OH, $NH_2$, NHR or —SH, where R is a hydrocarbon group containing up to 8 carbon atoms, or providing other crosslinking reactivity especially epoxy, cyanate, isocyanate, acetylene or ethylene, as in vinyl, allyl or maleimide. Preferably at least 50% of the groups Y of the polysulphone are $NH_2$.

In preferred forms the composition is characterised by chemical bonds bridging the interface between a thermoset resin phase and a polyarylsulphone phase. As a result of the fineness of the mutual dispersion of the two phases, the solubility or swellability of the thermoplast is substantially less than if thermoset resin were not present. This is so even if the thermoplast is of molecular weight over 10,000 or if it is halogen-ended, so that insolubilisation by reaction of end-group with thermoset precursor is limited, if present at all, but is more pronounced when the thermoplast carries thermosetreactive groups, as will be described.

The polyarylsulphone constitutes preferably at least 10, for example 20–40, percent by weight of the total resin and polymer present.

The thermoset component can be for example one or more of the following:
addition-polymerisation resins such as acrylics, vinyls, bis-maleimides (BMI) and unsaturated polyesters;
formaldehyde condensate resins such as with urea, melamine phenols
cyanate resins
isocyanate resins
functionalised polyesters, polyamides or polyimides an mixtures of two or more of these.

If an epoxy thermoset component is present it is typically the mono or poly-glycidyl derivative of one or more of:
aromatic diamines
aromatic monoprimary amines
aminophenols
polyhydric phenols
polyhydric alcohols
polycarboxylic acids
Examples are the following, which are liquids at ambient temperature:
tetraglycidyl diamino diphenylmethane e.g. "MY 720" or "MY 721" solid by Ciba-Geigy, viscosity 10–20 Pa s at 50° C.
triglycidyl derivative of p-aminophenol (e.g. "MY 0510" sold by Ciba-Geigy), viscosity 0.55–0.85 Pa s at 25° C.;
diglycidyl ether of 2,2-bis(4,4'-dihydroxy phenyl) propane (e.g. "Epikote 828" sold by Shell);
epoxy Novolak (e.g. "DEN 431" sold by Dow),
bisphenol F, which is in the low viscosity class; ("PY 306" of Ciba-Geigy)
Other epoxy resin precursors includes cycloaliphatics such as 3',4'-epoxycyclohexyl-3-4-epoxycyclohexane carboxylate (e.g. CY 179 sold by Ciba-Geigy) and those in the "Bakelite" range of Union Carbide Corporation.

The following epoxy resin precursors permit formulation of the composition with fewer precautions to avoid excessive tack:
EPON 825 (Shell), especially those versions having a viscosity up to 6000 cps at 25° C.
DER 822 (DOW);
Advanced bisphenol A resin precursors for example: DER 661 (DOW), especially in versions having an epoxy equivalent weight (EEW) in the range 475–575: EPON 1001 (SHELL), especially those versions having an epoxy equivalent weight in the range 450–550;
Epoxy novolaks, especially those of relatively high molecular weight such as DEN 438, DEN 439 and DEN 485 available from DOW,
Epoxy cresol novolaks, for example ECN 1235, ECN 1273 and ECN 1299 available from Ciba-Geigy;
Tetraglycidyl diamino diphenylmethane of relatively high molecular weight, such as MY 0500 (Ciba-Geigy), which has EEW 105–115 and viscosity 1500–5000 cps at 25° C.;
Diglycidyl phthalate, such as GLY-CELL A100 (ex HI-TEK CINTEREX), having EEW 150–165, viscosity 600–1800 cps at 25° C.

If the thermoset resin component is a BMI resin, it is derived suitably from a precursor of general formula

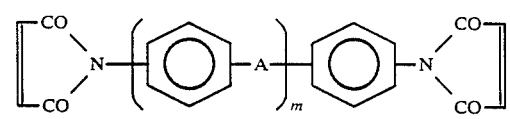

where m is 1 to 4 and A is as defined hereinbefore and the As differ when m exceeds 1.

The thermoset component, thermoplast component, the proportions thereof and of other constituents such as fillers, pigments and other polymers, and the degree of cure of the thermoset, are controlled preferably so that the composition in powder form at temperatures up to 100° C. is not self-adhesive under its own weight. At the same time, it is flowable as a viscous liquid at temperatures used in shaping it, for example over 150° C.

The thermoset component and thermoplast component are chosen preferably so that, at least after curing, each of the components is present at least partly as a phase continuous in at least one dimension.

In preferred composition the components are combined in a net work in which each extends continuously through any mass of the composition. On a microscopic scale, one phase is believed to be in the form of a net in 2 or 3 dimensions, and the second phase fills the interstices between the threads of the net. It appears that the first phase is anisotropic on a microscopic scale; the second phase can be isotropic or anisotropic.

The minimum dimension of each phase is typically at least 0.005, for example in the range 0.01 to 10, especially up to 5, microns. The maximum dimension of each phase is considerably greater for example L/D at least 10, and may be at least 10% of the geometric dimension of a mass of the composition. The two said phases can be the product of spinodal decomposition of an initially substantially homogeneous liquid mixture containing the polyarylsulphone and the uncured or incompletely cured thermoset resin component.

The morphology of the composition is evident in solid structures formed from the composition. The invention includes also precursor compositions which are flowable or plastic and are convertible to such a solid composition by solvent removal and at least partial curing; in such a flowable or plastic composition the specified morphology may be evident, but more usually shows only after solvent removal and/or curing.

This preferred morphology is obtained especially when the $SO_2$ content is at the above-defined preferred levels.

The composition may contain additives for example conventional toughening agents such as liquid rubbers having reactive groups, aggregates such as glass beads, rubber particles and rubber-coated glass beads, fillers such as polytetrafluoroethylene, graphite, boron nitride, mica, talc and vermiculite, pigments, nucleating agents, and stabilisers such as phosphates. The total of such materials and any fibrous reinforcing agent should be such that the composition contains at least 20% by volume of the polysulphone/thermoset mixture. The percentages of fibres and such other materials are calculated on the total composition after curing at up to 200° C.

The composition is particularly suitable for fabrication of structures, including load-bearing or impact resisting structures. For this purpose it may contain a reinforcing agent such as fibres. Fibres can be added short or chopped typically of mean fibre length not more than 2 cm, for example about 6 mm, typically at a concentration of 5 to 35, preferably at least 20%, by weight.

The fibre can be organic, especially of still polymers such as poly paraphenylene terephthalamide, or inorganic. Among inorganic fibres glass fibres such as "E" or "S" can be used, or alumina, zirconia, silicon carbide, other compound ceramics or metals. A very suitable reinforcing fibre is carbon, especially as graphite. Organic or carbon fibre is preferably unsized or are sized with a material that is compatible with the composition according to the invention, in the sense of being soluble in the liquid precursor composition without adverse reaction or of bonding both to the fibre and to the thermoset/thermoplastic composition according to the invention. In particular carbon or graphite fibres that are unsized or are sized with epoxy resin precursor or thermoplast such as polyarylsulphone can be used. Inorganic fibre preferably is sized with a material that bonds both to the fibre and to the polymer composition; examples are the organo-silane coupling agents applied to glass fibre.

In one form of the invention the composition is provided as granular or powder of particle size in the range 0.05 to 2.0 mm. For this purpose the composition can contain any of the above mentioned additives if sufficiently finely divided and/or fibres if sufficiently short.

In another form of the invention the composition is provided as pieces each containing substantially parallel continuous fibre. The pieces are typically 2-100, especially 5-30 mm in the direction of the fibres within them.

Such powder or short lengths will be referred to as "moulding feed", and can be used in any of the shaping procedures with which the invention is concerned.

The moulding feed may consist of the composition or may include also particles of other material, such as fillers or pigments. Further, the moulding feed may contain particles containing the thermoset component and thermoplast component but none or less than the full requirement of auxiliaries such as hardeners or curing catalysts, along with one or more of such auxiliaries present as a separate phase such as particles or a coating on the thermoset/thermoplast particles.

The invention provides a method of making a moulding composition by (a) making a blend comprising at least on polyarylsulphone as defined above, at least one thermoset resin precursor and optionally a solvent for one or more of said polymer and resin precursor said components being selected and the conditions of blending being controlled so that the polymer and precursor are present as a substantially homogeneous single phase stable liquid mixture;

(b) cooling/or removing solvent from said blend to give a mixture that is solid at a temperature under 50° C.;

(c) comminuting said solid.

If desired, step (b) can be carried out by applying the liquid to continuous fibres and cooling and/or removing solvent from the impregnated films. Then step (c) is modified (c1) to chopping the impregnated fibres into lengths 2-100, especially 5-30, mm in the direction of the fibres.

The invention provides further a method of making a shaped article by (d) unless sufficient is already present, mixing a hardener and/or a curing catalyst to the product of step (c)(or (c1).

(e) shaping the product of step (d) with, if necessary, application of heat and/or pressure;

(f) maintaining the shaped product of step (e) at a (possibly raised) temperature for a time sufficient to cure the thermoset component of the composition.

Among the shaping steps usable are:

1. compression-moulding especially for printed circuit boards, pump rotors, gears;
2. injection moulding, to give products such as electrical items, especially encapsulated semiconductors and microchips; thus the composition is very suitable for injection about an electrically conducting member;

3. transfer-moulding, especially for encapsulation of capacitors, diodes and resistors, and for transformer bushings;
4. extrusion or pultrusion, to give products such as insulated electrical conductors, rods, tubes, and special profiles such as window frames and honeycombs;

As a result of the high toughness and strength, and low tendency to chipping in manufacture and use, of moulded articles made from the composition, these are expected to find application in the automotive industry, in particular as the engine inlet manifold, engine valve cover, water pump and turbine housing.

As a result also of the high dielectric strength of the composition when cured, the invention is of great benefit in electrical applications. Particular examples are connectors, switchgear, housing and supports. Thinner walls are needed for insulation, there is better press fit interference for contacts, and absorption of greater amounts of electrical energy in breaking circuits.

EXAMPLE 1

(a) Composition preparation in liquid form

A polyarylsulphone consisting of repeat units I and II as defined above in the mole ratio 40:60, having 70% $NH_2$ end-groups, RV 0.27, and Tg 199° C. was dissolved in methylene chloride to give a 30% by weight solution. To the solution were added the following mixture of epoxy resin precursors:

| | |
|---|---|
| MY 0510 | 36.9 % by weight |
| PY 306 | 32.9 |
| together with the hardener | |
| 3,3'-diaminodiphenylsulphone | 30.1 |

To the mixture the latent curing catalyst 2-phenyl-4-methylimidazole (2% by weight on total resin solids) was added.

The mixture was stirred until apparently homogeneous.

(b) Conversion to moulding composition

Carbon fibre (IM7 6K, ex Hercules) was passed through a dip tank of the mixture at 50–75 cm per min, picking up 50–55% by weight of the solution, then passed through a hot air oven whereby its methylene chloride content was decreased to 5–8%, dry enough to permit chopping, the dry fibres were chopped to average length under 2 mm, then dried further to under 1% volatiles.

The chopped composition-carrying fibres were compression-moulded into test specimens at 2500 psi (170 bar) at 170° C. for 15 min, the post cured for 2 h at 177° C. The specimens were tested in a Dyantup instrumented impact tester in comparison with a commercially used epoxidised cresol novolak cured with 5%. $BF_3/CH_3NH_2$. The invention specimens:
  absorbed about twice the energy
  withstood 29–41% more load at failure
  showed higher punch shear and flexural strength.

EXAMPLE 2

A composition in liquid form made as in Example 1(a) was heated at 60–80 deg C. under a pressure of under 10 mm Hg until apparently dry. The resulting solid, of merinque-like consistency, was ground finely.

A sample of the composition was fed into the barrel of an injection-moulding machine, heated therein to 170° C., then forced into a mould. The mould was held at 177° C. for 2 h, then discharged. Moulded specimens were tested as in Example 1(b) and standard ASTM specimens were tested for electrical properties in comparison with the commercial material. The invention specimens showed;
  25% higher dielectric strength, viz 500 volts per mil
  20–25% higher flexural strength
  15% higher flexural modulus
  15% higher punch shear strength, viz over 40000 psi.

EXAMPLE 3

(a) Phenolic resin precursor was dissolved in a 9:1 w/w mixture of methylene chloride and methanol at ambient temperature. Powdered polyarylsulphone (PAS) consisting of units I and II in the mole ratio 40:60, having MW 16,000 and 91% $NH_2$ end groups was dissolved at 4 concentrations in the resin solution at ambient temperature. To mixture was added hexamethylenetetramine (15% of the total solids of the phenolic resin precursor). The mixture was evaporated at 60° C., less than 5 mm Hg pressure, until it became a dry powder. The powder was ground to pass a 30 mesh screen.

(b) A moulding composition was formulated as follows:

| | |
|---|---|
| powder from (a) | 35 g |
| 3.2 mm chopped glass fibres | 30 |
| mould lubricants and colorants | 2 |
| Wollastonite-calcium silicate filler | 33 |

The moulding feed was compounded on a two-roll mill:

| | |
|---|---|
| roll speed ratio | 1.3:1 |
| fast roll temp °C. | 80–120 |
| slow roll temp °C. | 10–20 |
| time, min | 3 |

The resulting sheets were ground to a size range 8–140 mesh. Test specimens were made by compression moulding at 160°–170° C., then cured at this temperature of 5 min. Results are shown in Table 1.

TABLE 1

| Property | Control | A | B | C | D |
|---|---|---|---|---|---|
| % of PAS w/w | 0 | 35 | 25 | 10 | 12 |
| Plasticity Tests | | | | | |
| Spiral flow at 14 tons - inches | 40 | 3 | 11 | 27 | 33 |
| Brabender | | | | | |
| gel time - secs | 126 | 91 | 84 | 98 | 120 |
| torque - meter grams | 250 | 1,000 | 1,000 | 400 | 350 |
| Heat distortion - °C. | 250 | 216 | 217 | 180 | 200 |
| Tg - °C. | 210 | 168 | 186 | 200 | 202 |
| Molding Shrinkage - in/in | .0015 | .0015 | .002 | .002 | .002 |
| Thermal Coeff of Expansion - in/in ° C. × $10^{-6}$ | 20 | 27 | 29 | 27 | 30 |
| Tensile strength - psi | 12,500 | 11,600 | 18,400 | 17,700 | 18,200 |
| Tensile mod of elasticity - psi × $10^6$ | 2.64 | 2.25 | 3.0 | 2.88 | 2.76 |
| Tensile elongation - % | 0.51 | 0.58 | 0.73 | 0.71 | 0.77 |
| Flexural strength - psi | 10,100 | 17,200 | 27,900 | 26,100 | 21,000 |
| Flexural mod of elasticity - psi × $10^6$ | 1.82 | 2.20 | 2.36 | 2.26 | 2.20 |
| Dynatup impact test | | | | | |
| Total energy - ftlbs | 3.7 | 4.1 | 7.0 | 5.1 | 4.9 |
| Energy at failure - ft lbs | 2.8 | 3.6 | 4.9 | 3.8 | 3.9 |
| Pounds load at | 310 | 328 | 384 | 390 | 400 |

TABLE 1-continued

| Property | Control | A | B | C | D |
|---|---|---|---|---|---|
| failure - lbs | | | | | |
| Dielectric strength - volts/mil | | | | | |
| S/T | 380 | 385 | 490 | 380 | 490 |
| S/S | 200 | 330 | 470 | 230 | 370 |

It is evident that the mouldings containing the polyarylsulphone are better in toughness, strength and dielectric strength. The lower Tg and higher expansion coefficient are not significant for many uses. The optimum content of polyarulsulphone is about 25%.

EXAMPLE 4

(a) Epoxy resin precursor DOW 438 was dissolved in a 9:1 w/w mixture of methylene chloride and methanol at ambient temperature. Phenolic resin precursor was dissolved in to the epoxy solution, followed by polyarylsulphone of the type used in Example 3, at 7 concentrations. The mixture was evaporated, ground and screened as in Example 3.

The moulding feed was formulated as follows:

| | |
|---|---|
| powder from (a) | 28.5 g |
| 3.2 mm chopped glass fibres | 5.0 |
| mould lubricants and colarants | 2.0 |
| fused silica filler | 64.5 | and compounded as in Example 3.

Test specimens were made as in example 3. Results are shown in Table 2.

TABLE 2

| Property | Control A | B | C | D | E | F | G | H |
|---|---|---|---|---|---|---|---|---|
| % of PAS w/w | 0 | 5 | 10 | 15 | 20 | 25 | 30 | 35 |
| Plasticity Tests | | | | | | | | |
| EMMI Spiral flow - inches | 54 | 18 | 13 | 18 | 4.5 | 25.5 | 8 | 8 |
| Brabender | | | | | | | | |
| gel time - secs | 95 | 75 | 97 | 84 | 70 | 119 | 91 | 90 |
| torque - meter grams | 0 | 75 | 85 | 65 | 125 | 100 | 200 | 350 |
| Heat distortion - °C. | 127 | 145 | 140 | 148 | 158 | 152 | 153 | 156 |
| Tg - °C. | 138 | 139 | 133 | 132 | 135 | 135 | 136 | 146 |
| Molding Shrinkage - in/in | .002 | .002 | .002 | .002 | .002 | .002 | .002 | .002 |
| Thermal Coeff of Expansion - in/in °C. × $10^{-6}$ | 43 | 37 | 38 | 36 | 35 | 30 | 34 | 32 |
| Tensile strength - psi | 5,900 | 6,200 | 5,800 | 5,600 | 8,500 | 10,200 | 12,000 | 12,500 |
| Tensile mod of elasticity - psi × $10^6$ | 1.7 | 2.2 | 2.0 | 2.0 | 2.0 | 2.1 | 2.1 | 2.0 |
| Tensile elongation - % | 0.34 | 0.29 | 0.29 | 0.28 | 0.47 | 0.53 | 0.63 | 0.72 |
| Flexural strength - psi | 16,200 | 14,200 | 11,900 | 13,300 | 14,700 | 17,500 | 19,500 | 20,000 |
| Flexural mod of elasticity - psi × $10^6$ | 2.0 | 2.1 | 1.9 | 2.0 | 1.9 | 2.0 | 2.0 | 1.9 |
| Dynatup impact test | | | | | | | | |
| Total energy - ftlbs | 2.7 | 3.5 | 3.6 | 3.4 | 3.4 | 5.7 | 6.2 | 8.5 |
| Energy at failure - ft lbs | 1.5 | 2.2 | 2.4 | 2.6 | 2.9 | 4.0 | 3.0 | -2.0 |
| Pounds load at failure - lbs | 219 | 288 | 280 | 270 | 312 | 322 | 319 | 277 |
| Dielectric strength - volts/mil | | | | | | | | |
| S/T | — | 320 | — | 480 | 640 | 550 | 700 | 700 |
| S/S | — | 360 | — | 450 | 520 | 450 | 530 | 530 |

It is evident that the mouldings containing the polyarylsulphone are again better in toughness, strength and dielectric strength. There is no significant change in Tg, but a slight improvement in HDT and coefficient of thermal expansion.

We claim:

1. A moulding composition comprising a homogeneous powder blend of a mixture of an uncured or partly cured thermoset resin precursor and, mixed intimately therewith, a polyarylsulphone containing the repeating unit $(PhSO_2Ph)_n$, where Ph is phenylene and n is 1 to 2 and can be fractional, the said repeating units being linked together through ether links or thioether links or through some ether links and some thioether links, and the polyarylsulphone contains also units Ph so linked.

2. A composition according to claim 1 in which units of the polyarylsulphone are $$XPhSO_2PhXPhSO_2Ph \qquad I;$$

and $$XPhXPhSO_2Ph$$

in ratio 35:65 to 65:35 where X is O or S and may differ from unit to unit.

3. A composition according to claim 1 in which the $SO_2$ content, defined as 100 times (weight of $SO_2$/(weight of average repeating unit) is in the range 23 to 25%.

4. A composition according to claim 1 in which the polyarylsulphone contains end-groups of formula —A'—Y where A' is a divalent aromatic hydrocarbon group and Y is a group reactive with the thermoset precursor, and wherein at least 50% of groups Y are $NH_2$.

5. A composition according to claim 1 in which the precursor is selected from the group consisting of an epoxy resin precursor and a phenol-formaldehyde resin precursor.

6. A composition according to claim 1 in the form of granules or powder of particle size in the range 0.05 to 2.0 mm, or in the form of pieces each containing substantially parallel continuous fibre and having a length 5-30 mm in the direction of the fibres within them.

7. A moulded electrical component made of a cured composition according to claim 1.

* * * * *